United States Patent [19]
Maeda

[11] Patent Number: 5,816,065
[45] Date of Patent: Oct. 6, 1998

[54] DESICCANT ASSISTED AIR CONDITIONING SYSTEM

[75] Inventor: Kensaku Maeda, Fujisawa, Japan

[73] Assignee: Ebara Corporation, Tokyo, Japan

[21] Appl. No.: 780,276

[22] Filed: Jan. 9, 1997

[30] Foreign Application Priority Data

| Jan. 12, 1996 | [JP] | Japan | 8-022134 |
| Jul. 12, 1996 | [JP] | Japan | 8-203156 |
| Jul. 12, 1996 | [JP] | Japan | 8-203157 |
| Jul. 12, 1996 | [JP] | Japan | 8-203158 |
| Aug. 8, 1996  | [JP] | Japan | 8-225929 |

[51] Int. Cl.⁶ .............................. F25B 21/00; F25D 23/00
[52] U.S. Cl. ............................................... 62/271; 62/94
[58] Field of Search ........................... 62/93, 94, 96, 62/97, 173, 180, 186, 187, 271, 185

[56] References Cited

U.S. PATENT DOCUMENTS

| 2,257,478 | 9/1941  | Newton ........................ 62/94 |
| 2,700,537 | 1/1955  | Pennington .................. 261/83 |
| 4,180,985 | 1/1980  | Northrup ...................... 62/94 |
| 4,430,864 | 2/1984  | Mathiprakasam ........... 62/94 |
| 4,474,021 | 10/1984 | Harband ....................... 62/94 |
| 4,741,178 | 5/1988  | Fujiu et al. .................. 62/525 |
| 4,887,438 | 12/1989 | Meckler ....................... 62/271 |
| 4,984,434 | 1/1991  | Peterson et al. ............. 62/94 |
| 5,040,375 | 8/1991  | Von Dobeln ................. 62/94 |
| 5,170,633 | 12/1992 | Kaplan ......................... 62/94 |
| 5,325,676 | 7/1994  | Meckler ....................... 62/93 |
| 5,448,895 | 9/1995  | Coellner et al. ............. 62/94 |
| 5,517,828 | 5/1996  | Calton et al. ................ 62/271 |
| 5,649,428 | 7/1997  | Calton et al. ................ 62/94 |

Primary Examiner—William Doerrler
Attorney, Agent, or Firm—Armstrong, Westerman, Hattori, McLeland & Naughton

[57] ABSTRACT

A high efficiency air conditioning system combining a desiccant assisted air conditioner with a heat pump device in which quick start-up of the system under all conditions by selecting a start-up mode operation is disclosed. The desiccant assisted air conditioning system comprises a recovery heat exchanger for recovering heat from the regeneration air flowing downstream of the desiccant device in the regeneration passage into the refrigerant flowing in the heat pump cycle passage for use as heat of evaporation in the heat pump device.

36 Claims, 17 Drawing Sheets

DESICCANT ASSISTED AIR CONDITIONING SYSTEM

BACKGROUND OF THE INVENTION

1. Field of the Invention

The present invention relates in general to air conditioning systems, and relates in particular to a desiccant assisted air conditioning system utilizing a heat pump device or a refrigeration device for desiccant regeneration and cooling of process air.

2. Description of the Related Art

An example of known prior art for desiccant assisted air conditioning system is disclosed in a U.S. Pat. No. 2,700,537. Such earlier desiccant types of air conditioning systems require a heat source operating at temperatures of 100°~150° C. for regeneration of desiccant material (moisture adsorbent), and necessitated the use of such high temperature heat sources as electrical heater and boiler. Recent developments permitted some desiccant to be regenerated at 60°~80° C., and lower temperature operation of the system has become possible. Such low temperature heat sources utilize a combination of electrically driven vapor compression heat pump or refrigerating machine for desiccant regeneration and cooling of process air.

FIG. 15 is an example of prior art disclosed in a U.S. Pat. No. 4,430,864 and comprises: a process air passage A; a regeneration air passage B; two desiccant beds 103A, 103B; and a heat pump device 200 for desiccant regeneration and cooling of process air. The heat pump device 200 is provided with two heat exchangers embedded in the two desiccant beds 103A, 103B, one of the desiccant bed is used as a high/low temperature heat source. One of the desiccant beds is used to flow process air to carry out moisture adsorption, and the other desiccant bed is used for flowing regeneration air to carry out desiccant regeneration. After these processes have been carried out for sometime, regeneration air and process air are switched by means of switching valves 105, 106 to carry out reverse steps.

In the technology described above, the high/low temperature sources and the desiccant devices are integrated into one unit respectively, and an amount of heat corresponding to the cooling effect $\Delta Q$ for the air conditioning system becomes a thermal load on the heat pump (refrigerating machine). The thermal efficiency of the entire system is thus limited by the capacity of the heat pump, and no extra effect is achieved within the system. Therefore, it may be concluded that complexity of the system is not worth the effort.

To resolve such a problem, the following type of arrangement may be considered. That is, as shown in FIG. 16, a high temperature source 220 is disposed in the regeneration air passage to heat the regeneration air, while a low temperature heat source 210 is disposed in the process air passage to cool the process air. Also, a heat exchanger 104 may be provided for transferring sensible heat between post-desiccant process air the pre-desiccant regeneration air. In the example shown, the desiccant device is a desiccant wheel 103 rotatable to traverse the process air passage A and the regeneration air passage B.

In such a system, as shown in a psychrometric chart in FIG. 17, total cooling effect ($\Delta Q$) of a cooling effect produced by the sensible heat exchanger added to the cooling effect provided by the heat pump device may be obtained for the entire system, thus resulting in a higher thermal efficiency and a more compact design of the entire system than the system shown in FIG. 15.

However, even in such a system, after the system has been inactive for a long period of time, the desiccant material naturally adsorbs moisture from the environment, and during the start-up phase of the system operation, its adsorption ability is decreased. This effect is shown by dotted lines in FIG. 17 indicating that sufficient dehumidification cannot be produced in the system in the start-up period. The temperature of the air at the outlet of the desiccant does not rise (state L), consequently, the temperature difference between the process air and the regeneration air in the sensible heat exchanger 104 is small, so heat exchange is also low, and the inlet temperature of the high temperature heat source 220 for the regeneration air is also low (state R). Operating the heat pump device under these conditions, regeneration air cannot be heated to a sufficiently high temperature (state S). Therefore, the adsorption ability of the desiccant material cannot be recovered to delay the full operation of the system.

SUMMARY OF THE INVENTION

It is therefore necessary to develop a high efficiency air conditioning unit combining desiccant regeneration and cooling process air so as to enable the system to quickly reach its full operating ability under all conditions.

The above object is achieved by a desiccant assisted air conditioning system comprising: a process air passage for flowing process air; a regeneration air passage for flowing regeneration air; a desiccant device which can be selectively communicated with either the process air passage or the regeneration air passage; a heat pump device having a compressor, an evaporator, a condenser and a heat pump cycle passage for flowing refrigerant therein, the heat pump providing a heating heat source for heating the regeneration air and cooling heat source for cooling the process air; a recovery heat exchanger for recovering heat from the regeneration air flowing downstream of the desiccant device in the regeneration passage into the refrigerant flowing in the heat pump cycle passage for use as heat of evaporation in the heat pump device.

Another aspect of the present invention is a desiccant assisted air conditioning system comprising: a process air passage for flowing process air; a regeneration air passage for flowing regeneration air; a desiccant device which can be selectively communicated with either the process air passage or the regeneration air passage; a heat pump device having a compressor, an evaporator, a condenser and a heat pump cycle passage for flowing refrigerant, the heat pump providing a heating heat source for heating the regeneration air and cooling heat source for cooling the process air; a regeneration promoting means for temporary promoting the regeneration ability of the regeneration air.

DESCRIPTION OF THE PREFERRED EMBODIMENTS

A first embodiment will be explained with reference to FIGS. 1~2.

Figure 1:
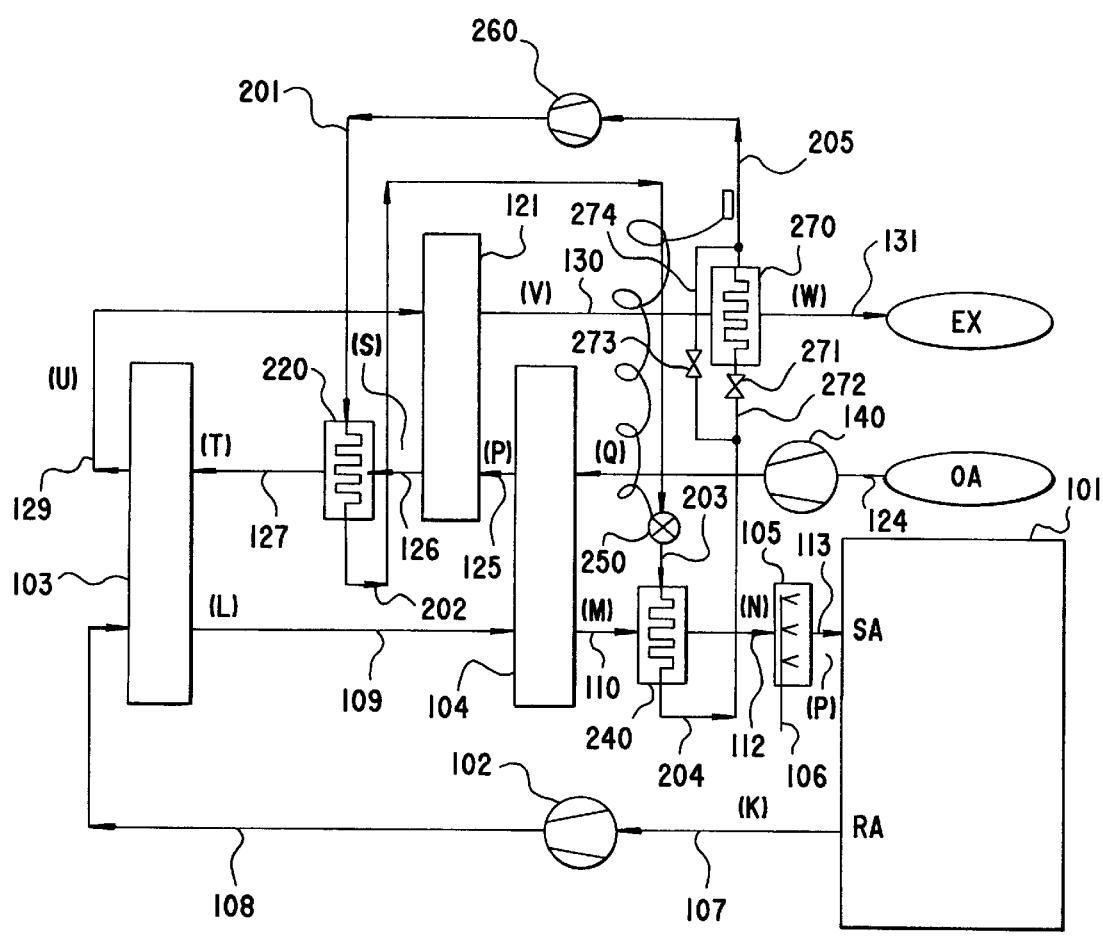
FIG. 1 is a schematic representation of a first embodiment of the desiccant assisted air conditioning apparatus of the present invention.
Figure 2:
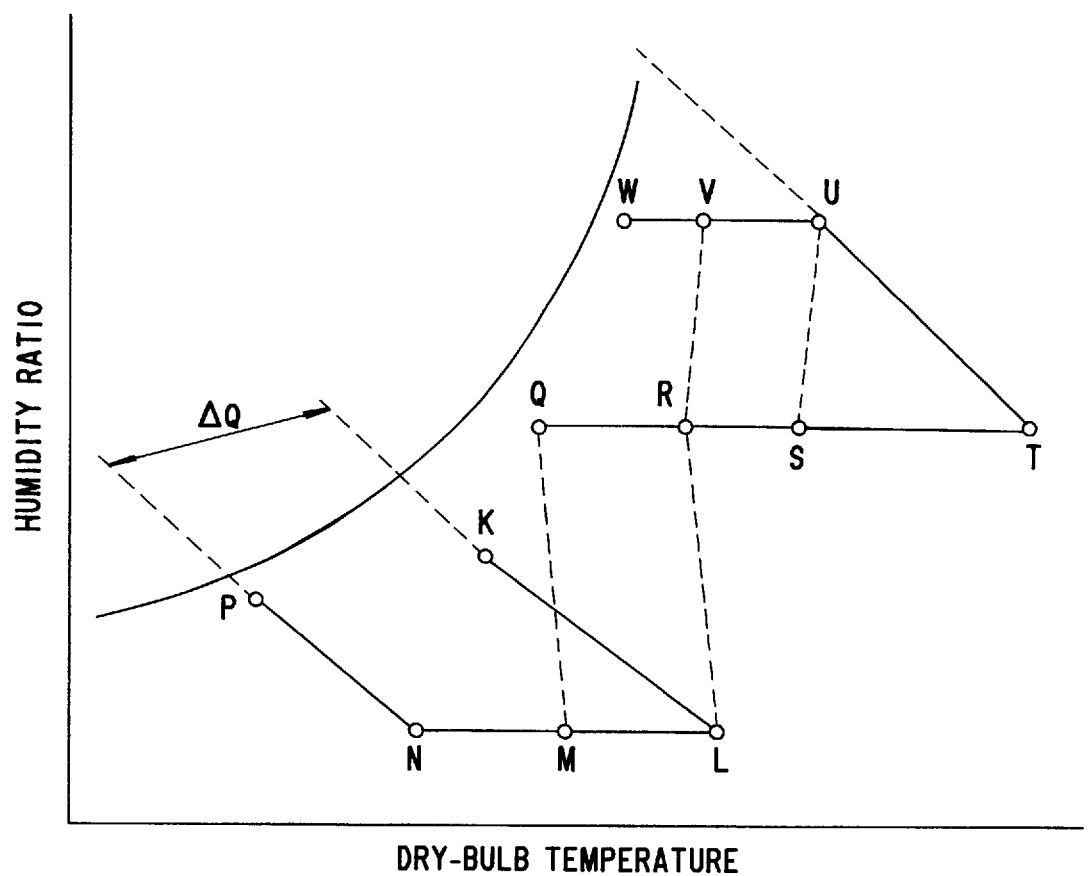
FIG. 2 is a psychrometric chart showing the desiccant air conditioning cycle of the first embodiment.

FIG. 1 is a schematic representation of the first embodiment of the desiccant assisted air conditioning system. The vapor compression heat pump section or the refrigeration section of the system comprises an evaporator (cooling device) 240, condenser (heating device) 220, a compressor 260 and an expansion valve 250 to perform refrigeration cycles by circulating a refrigerant through the passages 201, 202, 203 and 204. A recovery heat exchanger 270 for heat exchange with the regeneration air is provided in the refrigerant passage 272 between the evaporator 240 and the compressor 260 by way of a valve 271. A bypass passage 274 having a valve 273 is also provided so as to enable controlling the flow of refrigerant for the recovery heat exchanger 270 and the bypass passage 274 by operation of the valves 271, 273.

The air conditioning section of the desiccant assisted air conditioning apparatus shown in FIG. 1 is constructed as follows: the conditioning space 101 is communicated with the intake of the blower 102 through the passage 107; the outlet of the blower 102 is communicated with the desiccant wheel 103 through the passage 108; the discharge for the process air from the desiccant wheel 103 is communicated with the sensible heat exchanger 104 for the regeneration air through the passage 109; the outlet for the process air from the heat exchanger 104 is communicated with evaporator 240 through the passage 110; the outlet for the process air from evaporator 240 is communicated with the humidifier 105 through the passage 112; and the outlet for the process air from the humidifier 105 is communicated with the conditioning space 101 through the passage 113; thereby completing a processing cycle for the process air.

In the meanwhile, the regeneration air passage is as follows: outside environment is connected to the intake of the blower 140 through the passage 124; the outlet of the blower 140 is communicated with the sensible heat exchanger 104 heat-exchangeable with the process air; the outlet for the regeneration air from the sensible heat exchanger 104 is communicated with the inlet of the low temperature side of another heat exchanger 121 through a passage 125; the outlet of the low temperature side of the sensible heat exchanger 121 is communicated with the condenser 220 through the passage 126; the outlet for the regeneration air of the condenser 220 is communicated with the inlet for the regeneration air of the desiccant wheel 103 through the passage 127; the outlet for the regeneration air of the desiccant wheel 103 is connected to the inlet of the high temperature side of the sensible heat exchanger 121 through the passage 129; the outlet of the high temperature side of the sensible heat exchanger 121 is communicated with the recovery heat exchanger 270, the outlet for regeneration air of the recovery heat exchanger 270 is communicated to an external space through the passage 131, thus completing a regeneration air circulation. In FIG. 1, the circled alphabetical designations K~V refer to the thermodynamic states of the air corresponding to those in FIG. 3, and SA designates supply air, RA designates return air, OA designates outside air and EX designates exhaust air.

The cooling cycle of the vapor compression heat pump section of the desiccant assisted air conditioning system will be explained.

First, the normal mode of operation in which heat is not recovered from the regeneration air by using a heat pump will be described. In the normal mode, the valve 273 is opened and the valve 271 is closed to activate the bypass passage 274 to flow a refrigerant, and inactivate the heat exchanger 270. In such a cycle, the refrigerant extracts heat of evaporation from the process air in the evaporator (cooling device) 240 and is evaporated. The refrigerant vapor enters the compressor 260 through the passage 204 and the bypass passage 274, and is compressed. After the compression step, the refrigerant vapor enters the condenser (heater) 220 through the passage 201 and releases the heat of condensation to the regeneration air, and is condensed. The condensed refrigerant enters the expansion valve 250 through the passage 202, and after reducing pressure and expanding, returns to the evaporator (cooling device) 240.

Next, the case of start-up mode, in which heat is recovered from the regeneration air by using a heat pump will be explained. In the start-up mode, the valve 273 is closed and the valve 271 is opened. Therefore, the bypass passage 274 does not operate, and the heat exchanger 270 becomes active. In such a configured cycle, the refrigerant first extracts the heat of condensation from the evaporator (cooling device) 240 to partially be evaporated, and enters the heat exchanger 270 through the passages 204, 272. In the heat exchanger 270, the refrigerant exiting the evaporator (cooling device) 240, i.e., the unevaporated refrigerant evaporates so as to cool the regeneration air. The refrigerant vapor enters the compressor 260 through the passage 205, and after being compressed, enters the condenser (heating device) 220 through the passage 201 to condense while releasing the heat of condensation to the regeneration air. The condensed refrigerant enters the expansion valve 250 through the passage 202, and after reducing pressure and expanding, it returns to the evaporator (cooling device) 240.

Next, the operation of the vapor compression heat pump for recovering heat of from regeneration air when combined with a desiccant assisted air conditioning system will be explained. The operation of the unit, in which heat recovery from regeneration air is not carried out, is the same as the conventional system and will not be explained. FIG. 2 is a psychrometric chart of the operation of the air condition section in the first embodiment in which heat is recovered from the regeneration air.

In FIG. 1, the ambient air from the room 101 to be conditioned (process air) is drawn through the passage 107 into the blower 102 to be pressurized and is forwarded to the desiccant wheel 103 through the passage 108. In the desiccant wheel 103, the humidity ratio of the ambient air is lowered by the removal of moisture while releasing the heat of adsorption into the process air to raise its temperature.

The process air with a warmer temperature and a lower humidity is forwarded through the passage 109 to the sensible heat exchanger 104, and is cooled by heat exchange with outside air (regeneration air). Then the cooled air is further cooled by being forwarded to the evaporator 240 through the passage 110.

This process corresponds to the sensible heat change of the process air, and the change of temperature is as large as 10°~15° C., therefore, if the process air is not heated enough to have a temperature difference to facilitate heat transfer between the refrigerant and the process air, for example, in a start-up stage, the refrigerant can not be evaporated completely, and unevaporated portion will be evaporated in the heat exchanger 270. The cooled process air in the evaporator 240 is forwarded to a humidifier 105 to be cooled by water spraying or evaporative humidification in an isenthalpic process and is returned to the conditioning space 101 through a passage 113.

In this example, regeneration of the desiccant material is performed as follows by using outside air as regeneration air. Outside air (regeneration air) OA is drawn into the blower 140 through a passage 124 to be pressurized and forwarded to the sensible heat exchanger 104, cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a condenser 220 through the passage 126 to raise its temperature so as to lower its relative humidity. The regeneration air from the condenser 220 with a lowered humidity passes through the desiccant wheel 103 to remove the moisture from the desiccant wheel for its regeneration. Spent air from the desiccant 103 flows through a passage 129 to enter the sensible heat exchanger 121 to preheat the regeneration air prior to regeneration, and flows into the recovery heat exchanger through a passage 130 to evaporate the unevaporated refrigerant, while being cooled by the heat of evaporation, and is exhausted externally as waste air.

The above process can be explained with reference to the psychrometric chart shown in FIG. 2. The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 240 to be further cooled (state N). The cooled air flows through the passage 112 to reach the humidifier 105 so that its temperature is lowered in an isenthalpic manner by water spraying or evaporative humidification (state P), and is returned through the passage 113 to the conditioning space 101. In the above manner, an enthalpy difference $\Delta$ Q is produced between return air (state K) in the room and supply air (state P) for use for cooling of the conditioning space 101.

The desiccant is regenerated as follows. Outside air (OA: state Q) is drawn through the passage 124 into the blower 140, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the condenser 220 and is heated to raise its temperature as well as lower its relative humidity (state T). The heated air from the condenser 220 flows through the passage 127 to reach the desiccant wheel 103 thereby removing adsorbed moisture (state U).

Spent outgoing air from the desiccant wheel 103 flows through the passage 129 to reach the sensible heat exchanger 121 to preheat the regeneration air prior to regeneration process, and lowers its own temperature (state V) and flows into the passage 130 to reach the recovery heat exchanger 270 to evaporate the unevaporated refrigerant while being cooled by the heat of evaporation (state W), and after that, is exhausted out as waste air through passage 131. The processes of regeneration of desiccant and dehumidification and cooling of the ambient air described above is repeatedly performed to provide the desiccant assisted air conditioning process. It is a common practice to utilize exhaust air from the conditioning room as regeneration air, and in this invention also, there is no problem in recycling the exhaust room air for regeneration air, and the same result will be obtained.

In the desiccant assisted air conditioning system having the configuration presented above, the system operation is adjusted to suit the environment by operating the valve 273 in the bypass passage 274 and the valve 271 in the passage 272 to appropriately open or close. More specifically, when the process air temperature is low such that sufficient heat cannot be recovered, an amount of heat possessed by the regeneration air is recovered in the cooling cycle through the heat exchanger 270 to increase the heat of condensation available from the condenser, and this additional heat is used in the condenser (heating device) 220 to heat the regeneration air for desiccant regeneration. When the process air has attained sufficiently high temperature so that sufficient heat can be recovered from the process air, the bypass passage 274 is activated to stop the operation of the heat exchanger 270, and the system reverts to the normal mode of the system where heat recovered from process air plays a main role.

Although the air conditioning system of the embodiment comprises a combination of a heat pump having a vapor compression refrigeration cycle with a desiccant assisted air conditioner, other heat pumps having a heat pumping-up ability such as absorption heat pumps are applicable. This can also increase the heat of condensation by recovering the heat possessed by the regeneration air and utilizing it for desiccant regeneration in the same manner as the present embodiment. Further, in the above embodiment, refrigerant and air directly perform heat exchange in the condenser 220 and evaporator 240, which is also replaceable by a conventional indirect heat exchanging method using heat medium such as water.

Figure 3:
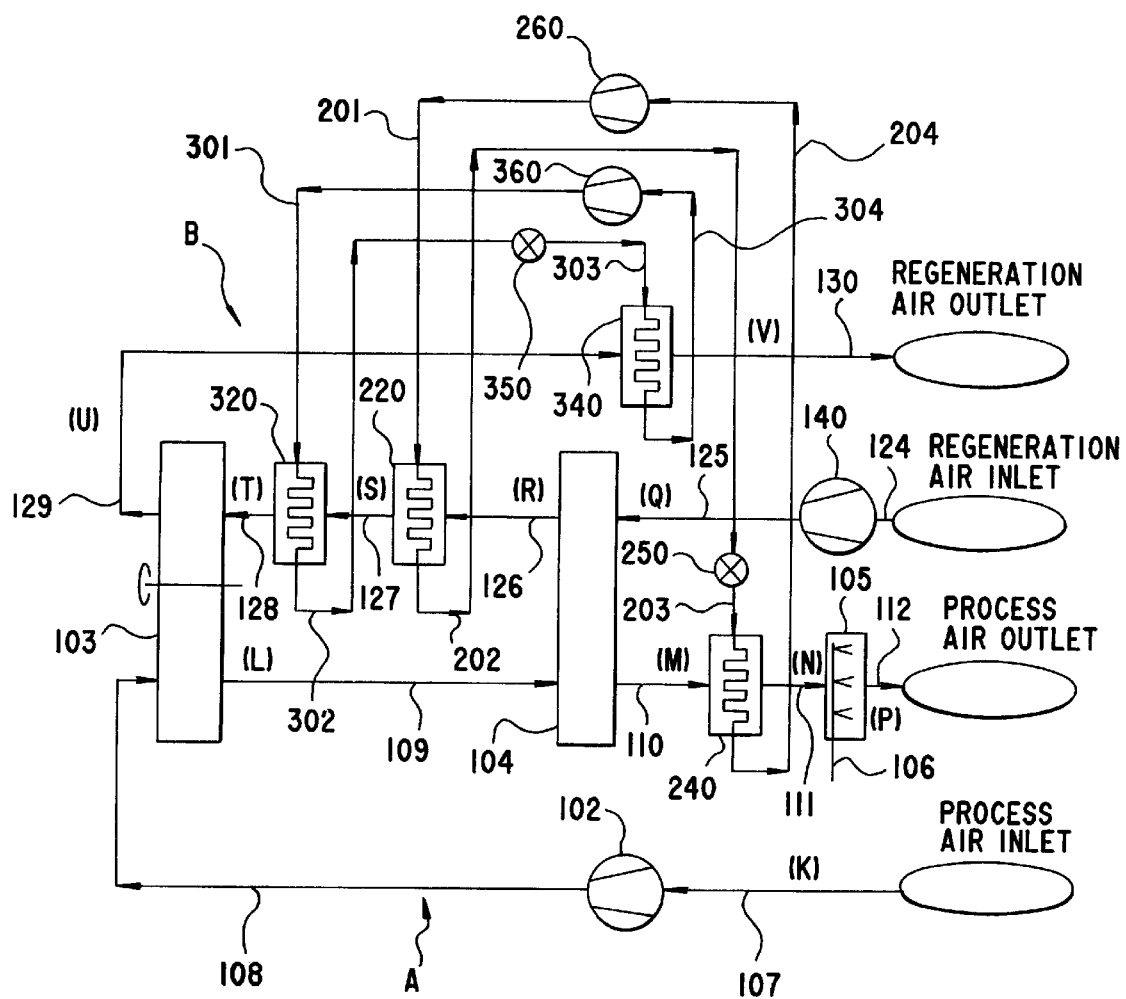
FIG. 3 is a schematic representation of a second embodiment of the desiccant assisted air conditioning apparatus of the present invention.

FIG. 3 is a schematic representation of the basic configuration of a second embodiment. In the configuration of the first embodiment shown in FIG. 1, a single heat pump, that is, a single refrigeration cycle unit is provided and recovery heat exchanger and cooling heat exchanger is arranged in series in the refrigeration cycle. In the second embodiment, two heat pumps are provided in parallel, and the evaporator in a first refrigeration cycle is located in the process air passage to heat-exchange with the dehumidified process air through desiccant device, and the evaporator in a second refrigeration cycle is located in the regeneration air passage for heat-exchanging with the spent regeneration air after regenerating the desiccant device.

The refrigeration cycle of the vapor compression heat pump section of the above desiccant assisted air conditioning system will be given as follows. The refrigerant in a first cycle extracts latent heat of evaporation from the air in the evaporator 240 to be evaporated, is drawn into the condenser 260 through the passage 204 to be compressed, and is forwarded through the passage 201 to the condenser 220 to be condensed while releasing heat of condensation to regeneration air. The condensed refrigerant reaches to expansion valve 250 via the passage 202 to expand and lower the pressure, then it flows to return to the evaporator 240. In the second cycle of the heat pump, the refrigerant extracts latent heat of evaporation from the air in the evaporator 340 to be evaporated, is drawn into the compressor 360 through the passage 304 to be compressed, and is forwarded through the passage 301 to the condenser 320 to be condensed while releasing heat of condensation to regeneration air. The condensed refrigerant reaches to expansion valve 350 via the passage 302 to expand and lower the pressure, then it flows to return to the evaporator 340.

Figure 4:
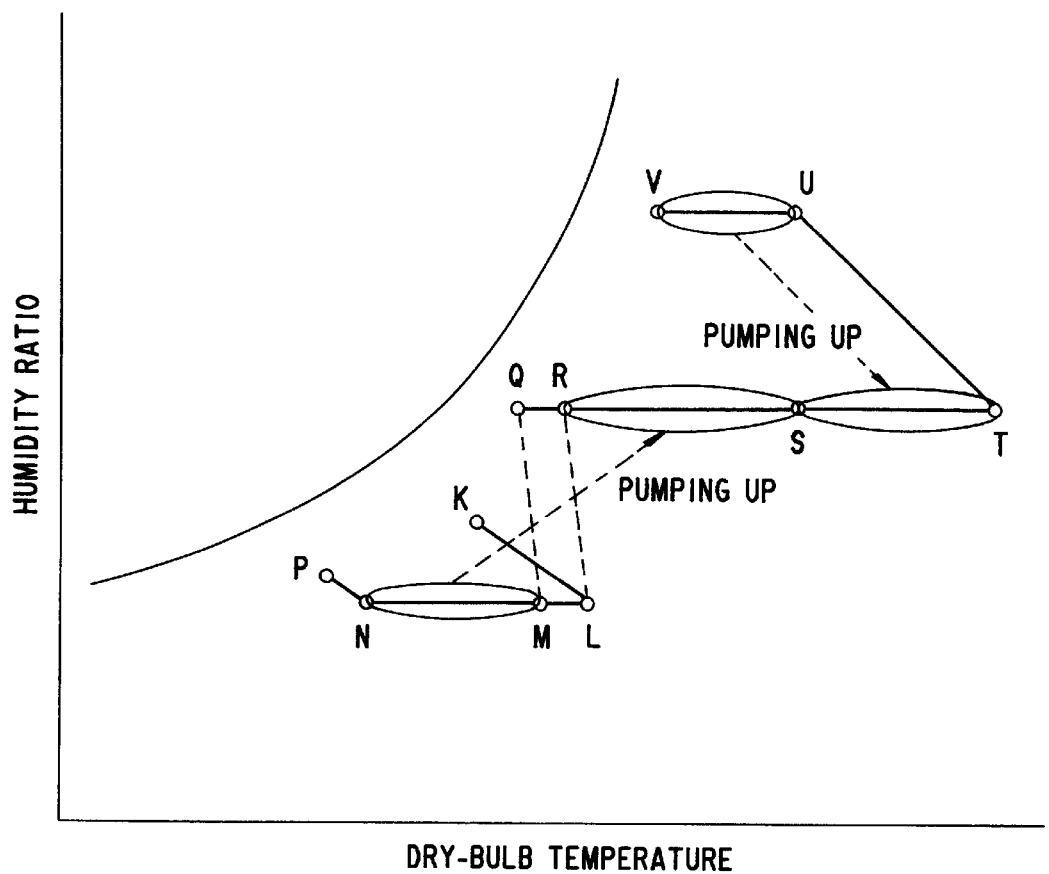
FIG. 4 is a psychrometric chart showing the desiccant air conditioning cycle of the second embodiment in case of a normal operational mode.

The above process can be explained with reference to the psychrometric chart shown in FIG. 4. The introduced return air (process air: state K) is drawn into the blower 102 through the passage 107 to be pressurized, and flows through the passage 108 to reach the desiccant wheel 103 so that its humidity ratio will be lowered by adsorption of moisture to the moisture adsorbent while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 240 to be further cooled (state N). The air thus cooled is forwarded to a humidifier 105 so that its temperature is lowered in an isenthalpic manner by water spraying or evaporative humidification (state P), and is returned through the passage 112 to the conditioning space 101.

The desiccant having adsorbed of moisture is regenerated by using outside air for regeneration as follows. Outside air (OA: state Q) is drawn through the passage 124 into the blower 140, is pressurized, forwarded to the sensible heat exchanger 104, cools the process air and raises its own temperature (state R), flows into the passage 126 to reach the condenser 220 and is heated by a first heat pump to raise its temperature (state S). The heated air from condenser 220 flows through the passage 127 to reach the condenser 320 to be heated by a second heat pump to a final temperature between 60°~80° C., so that its relative humidity is lowered (state T). The regeneration air having a lowered humidity flows through the desiccant wheel 103 thereby removing adsorbed moisture, and have its humidity increased and the temperature decreased (state U). Spent outgoing air from the desiccant wheel 103 flows through the passage 129 to reach the evaporator 340 to be recovered waste heat, and lowers its own temperature (state V) and flows into the passage 130 to be exhausted out as waste air. The processes of regeneration of desiccant and dehumidification and cooling of the ambient air described above is repeatedly performed to provide the desiccant assisted air conditioning process. It is also a common practice to utilize exhaust air from the conditioning room as regeneration air, and in this invention also, there is no problem in recycling the exhaust room air for regeneration air, and the same result will be obtained.

In the desiccant assisted air conditioning system having the configuration presented above provides the start-up mode of operation as follows. In the first heat pump cycle, sensible heat extracted from the post-desiccant process air is used to heat the pre-desiccant regeneration air (state R~S), and in the meanwhile, in the second heat pump cycle, the evaporator acting as heat exchanger for the post-desiccant regeneration air is activated to heat the pre-desiccant regeneration air by the heat extracted from the post-desiccant regeneration air (state S~T). By adopting such an arrangement, even during the start-up phase, when the desiccant material does not have sufficient adsorption ability, and the regeneration air temperature at the outlet of the sensible heat exchanger 104 is low, such that the state R and state Q are close together, it becomes possible to heat the regeneration air at the inlet of the desiccant 103 to a state T so as to enhance the regeneration ability of desiccant material and enables rapid recovery of desiccant adsorption ability, thereby offering an air conditioning system that offer a superior start-up performance.

After the completion of the start-up phase, when the desiccant 103 has recovered its full adsorption ability, the second heat pump cycle may be shut off.

In this embodiment, the condenser 320 in the second heat pump cycle is disposed downstream of the condenser 220 in the first heat pump cycle in the regeneration air passage. This is because, when the heat pump for the second cycle is shut off, less variance is generated in the temperature difference between the condenser 220 and the evaporator 240 than otherwise, and consequently in the compression ratio of the compressor so as to achieve a stable performance for the compressor in the first heat pump cycle.

Figure 5:
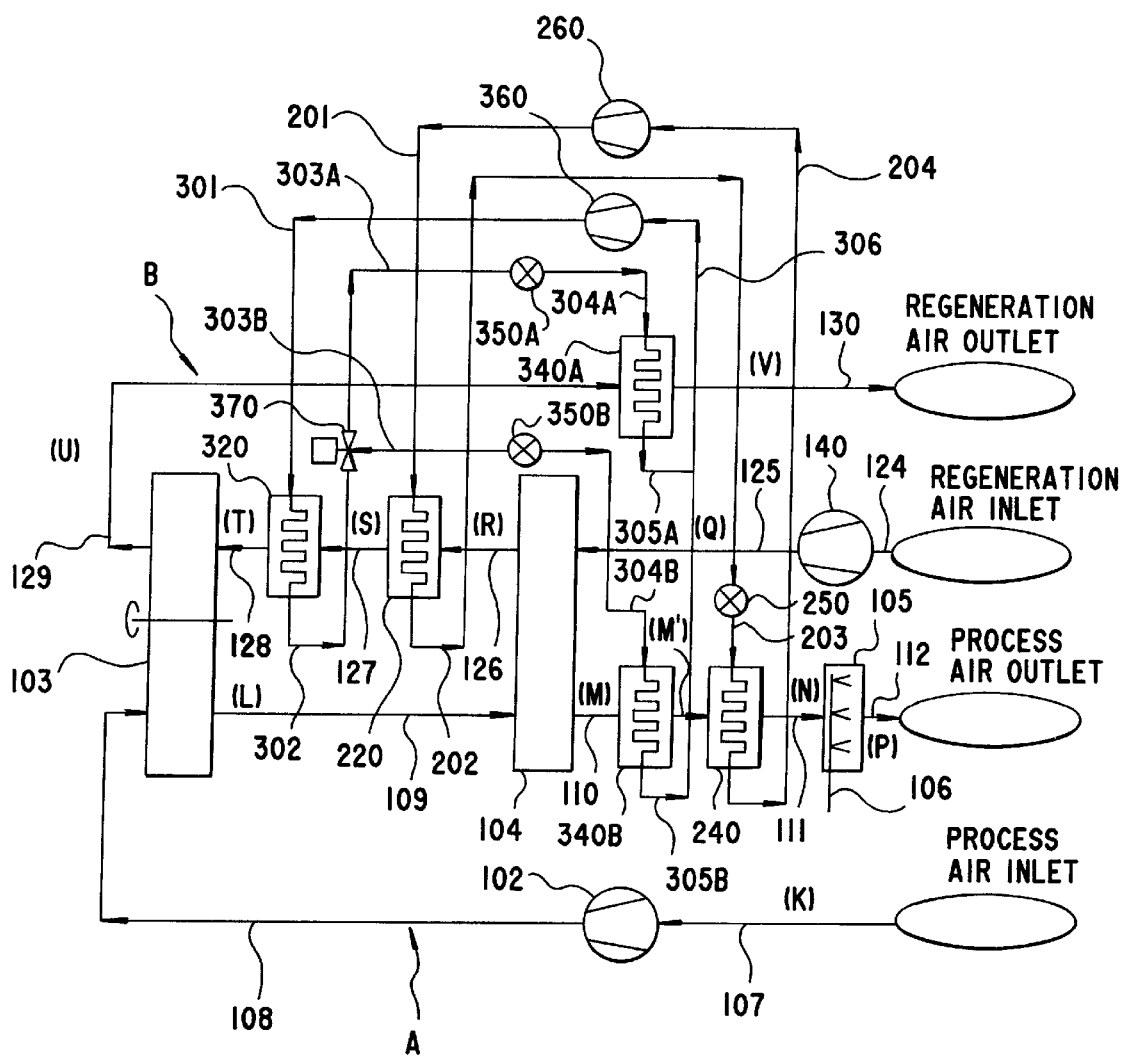
FIG. 5 is a schematic representation of a third embodiment of the desiccant assisted air conditioning apparatus of the present invention.

FIG. 5 is a schematic representation of a third embodiment based on an improvement over the second embodiment. In this embodiment also, there are two heat pump cycles present, however, the difference is that a condenser 320 and a switching valve 370 are provided so as to enable selective switching between two evaporators 340A, 340B. The evaporator 340A is disposed in the regeneration air passage and performs heat exchange with post-desiccant regeneration air, as in the case shown in FIG. 3, while the evaporator 340B is disposed in the regeneration air passage between sensible heat exchanger 104 and the evaporator 240 in the first heat pump cycle, and performs heat exchange with the process air from sensible heat exchanger.

In this configuration, when the regeneration preferred mode or start-up mode is selected by operation of switching valve 370 so that the evaporator 340A is activated in the second heat pump cycle as heat exchanger for post-desiccant regeneration air, the process is exactly the same as the second embodiment to recover heat from the post-desiccant regeneration air to heat the pre-desiccant regeneration air, so the benefits are the same. That is, even when the states R and Q are close together as shown in FIG. 4, because of insufficient desiccant's adsorption ability in the start-up phase, and the regeneration air temperature at the outlet of the sensible heat exchanger 104 is low, it becomes possible to heat the regeneration air to state T, thus enabling to prompt the desiccant regeneration ability, and allowing quick recovery of the whole air conditioning system.

When the start-up mode is completed, the switching valve 370 is operated to activate the evaporator 340B which is heat-exchangeable with the post-desiccant process air. By so doing, the process becomes the enhanced cooling mode in which further heat recovery from the pre-desiccant process air is made to utilize it for heating pre-desiccant regeneration air in both the first and second heat pump cycles.

Figure 6:
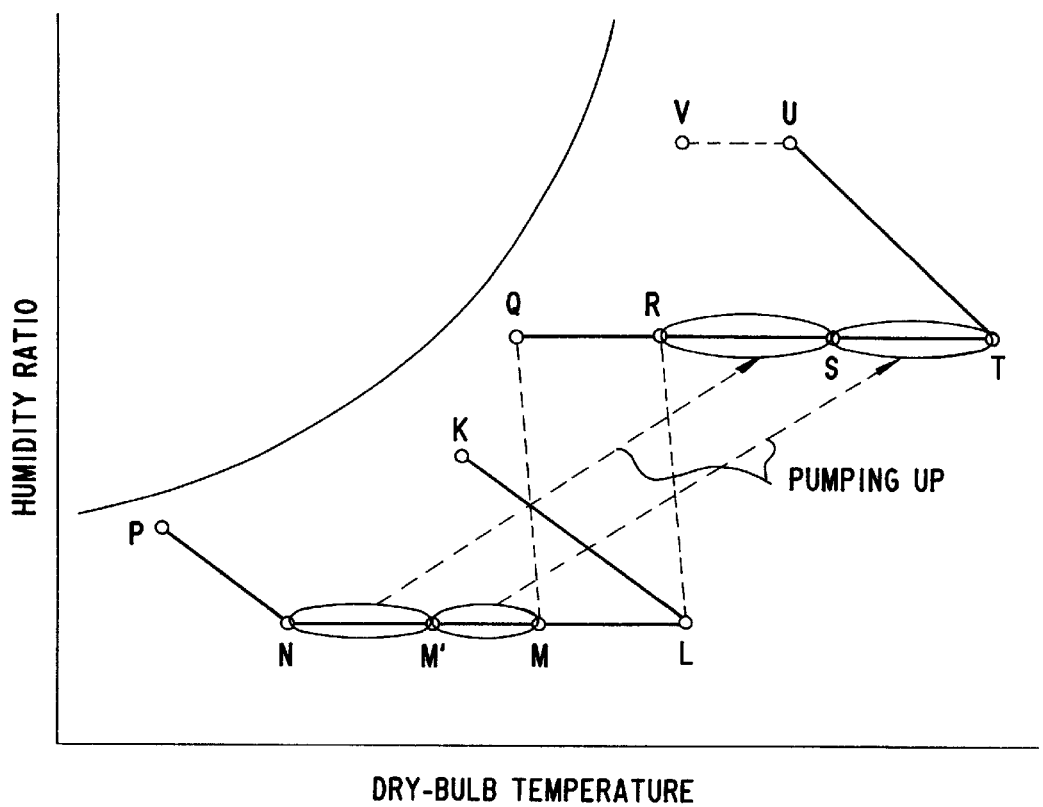
FIG. 6 is a psychrometric chart showing the desiccant air conditioning cycle of the third embodiment.

The process of the air conditioning system will be further explained with reference to a psychrometric chart of FIG. 6. The introduced return air (process air: state K) is drawn into the blower 102 through the passage 107 to be pressurized, and flows through the passage 108 to reach the desiccant wheel 103 so that its humidity ratio will be lowered by adsorption of moisture to the moisture adsorbent while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 340B of the second heat pump to be cooled (state M'), then flows to reach the evaporator 240 of the first heat pump to be further cooled (state N). The air thus cooled is forwarded to a humidifier 105 through the passage 111 so that its temperature is lowered in an isenthalpic manner by water spraying or evaporative humidification (state P), and is returned through the passage 112 to the conditioning space 101.

The desiccant is regenerated as follows by using outside air as regeneration air. Outside air (OA: state Q) is drawn through the passage 124 into the blower 140, is pressurized, forwarded to the sensible heat exchanger 104, cools the process air and raises its own temperature (state R), flows into the condenser 220 of the first heat pump through passage 126 to be heated by the heat pumped up from the evaporator 240 to raise its temperature (state S). Regeneration air from the condenser 220 flows through the passage 127 to reach the condenser 320 of the second heat pump and is heated by the heat pumped up from the evaporator 340B to a final temperature between 60°~80° C. (state T) so that its relative humidity is lowered. The regeneration air having a lowered humidity flows through the desiccant wheel 103 thereby removing adsorbed moisture (state U). Spent outgoing air from the desiccant wheel 103 flows through the passage 129 to reach the evaporator 340A, which is not operating because of the position of the switching valve 370, and flows into the passage 130 without temperature change to be exhausted.

The air conditioning system having the configuration presented above produced benefits such that, not only the quick recovery of desiccant regenerative ability is possible, but after the completion of the start-up phase, the heat pump cycles may be switched to enhance the recovery of heat from the process air to heat the regeneration air, thus cooling the process air even further. This leads to improved cooling efficiency and high energy utilization of the system as a whole.

In this embodiment, the condenser 320 in the second heat pump cycle is disposed downstream of the condenser 220 in the first heat pump cycle in the regeneration air passage B, and the evaporator 340B was disposed upstream of the evaporator 240 in the first heat pump cycle in the process air passage A. The reason for this is that this arrangement prevents excessive compressor load on either compressor in the first or the second heat pump cycle. This is because, during the normal mode operation, the temperature difference between the condenser 220 and the evaporator 240 in the first heat pump cycle (temperature difference between the states S and N) and the temperature difference between the condenser 320 and the evaporator 340B in the second heat pump cycle (temperature difference between the states T and M') become averaged, thus requiring about the same compression ratio in both compressors so that the loads on the compressor 260 in the first heat pump cycle and the compressor 360 in the second heat pump cycle become averaged over time, and excessive loading on either compressor can be avoided.

Figure 7:
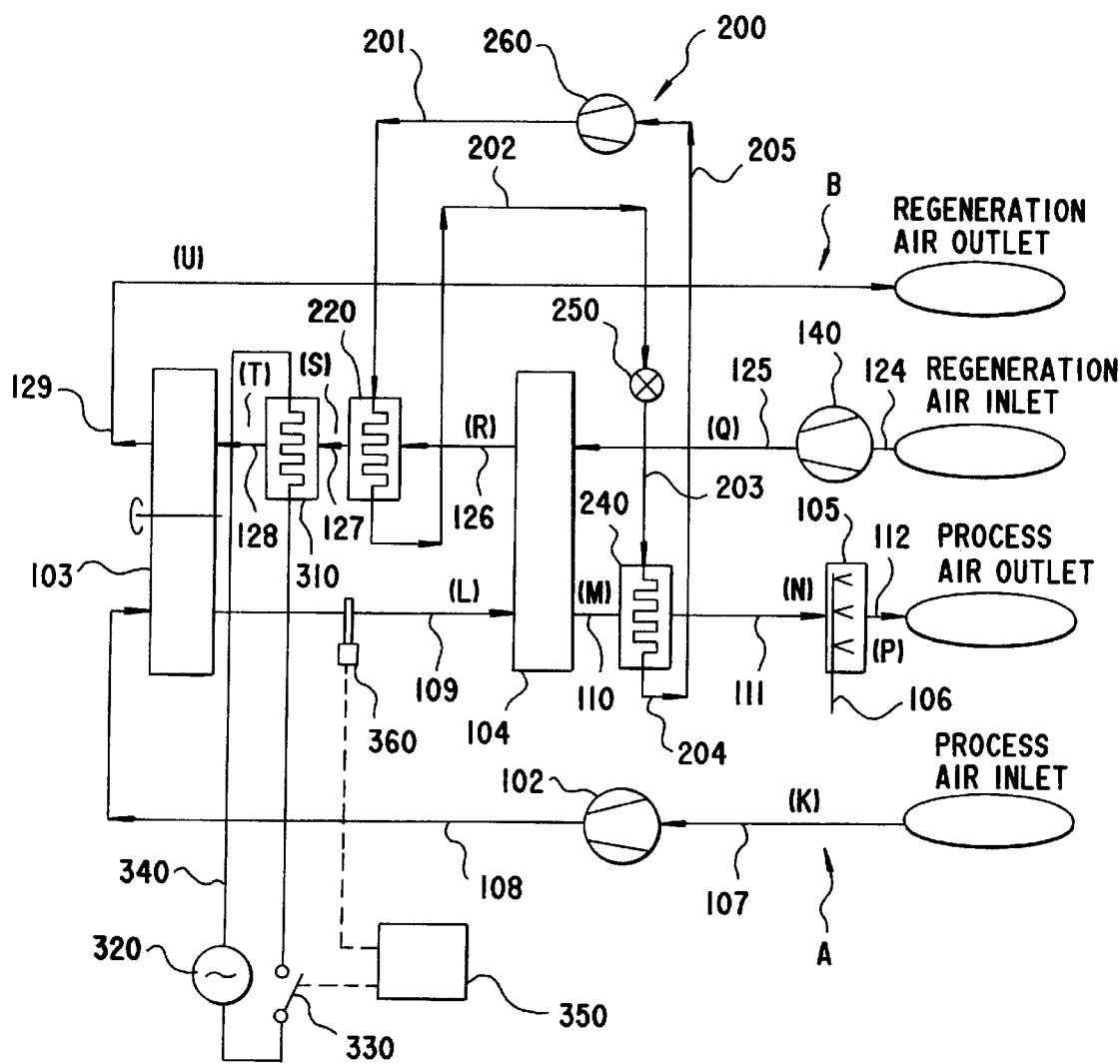
FIG. 7 is a schematic representation of a fourth embodiment of the desiccant assisted air conditioning apparatus of the present invention.
Figure 16:
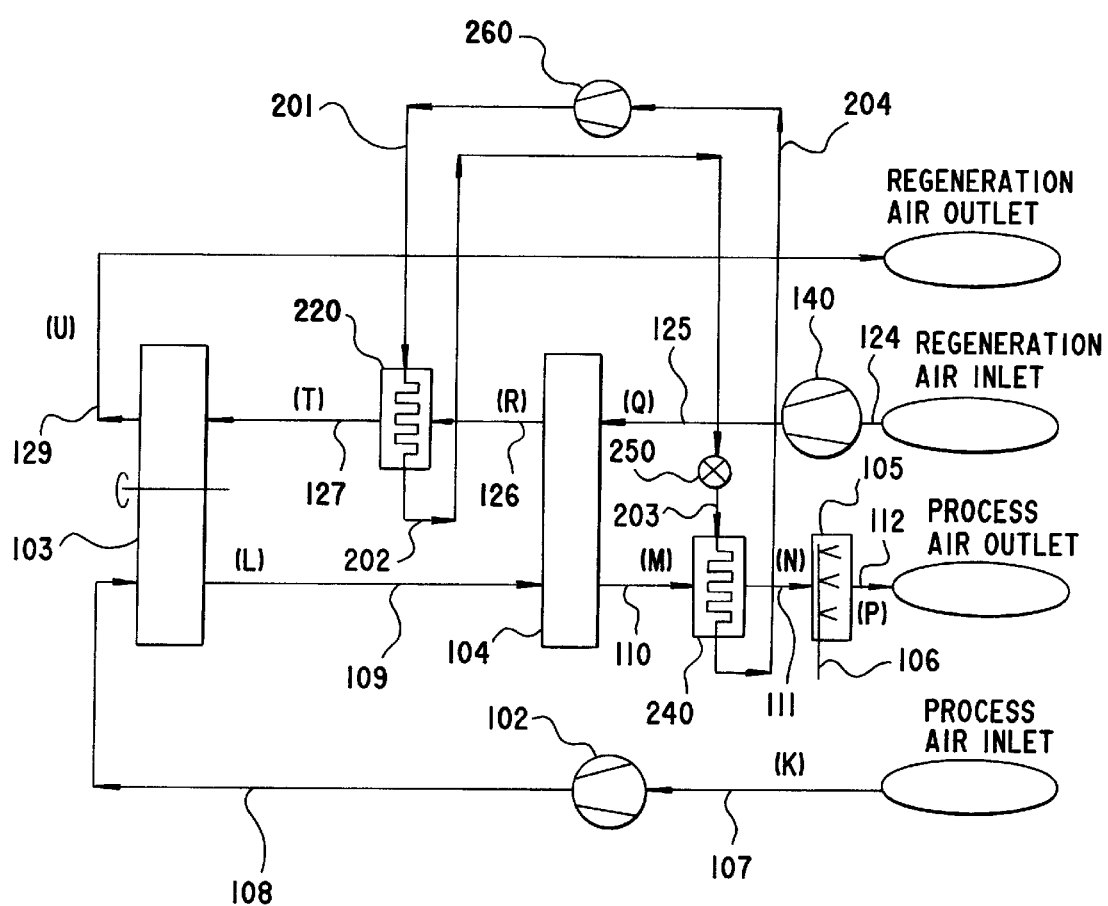
FIG. 16 is a schematic representation of another conventional desiccant assisted air conditioning apparatus.
Figure 17:
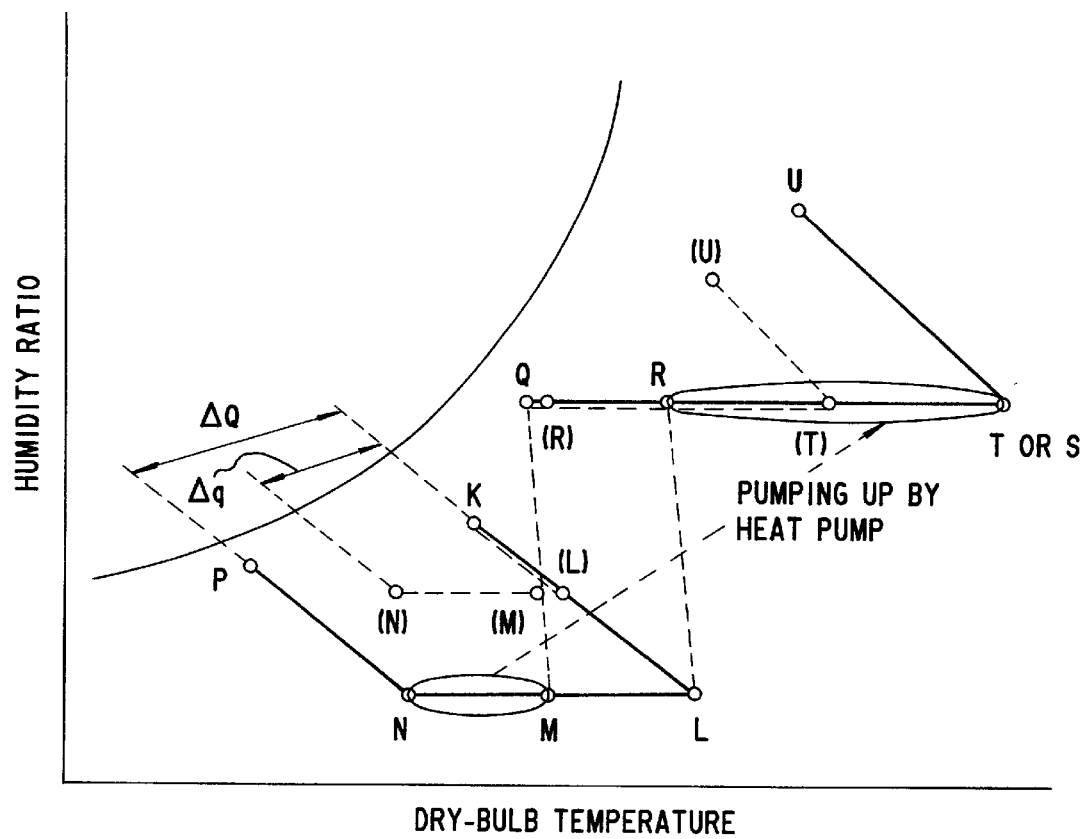
FIG. 17 is a psychrometric chart of the conventional desiccant assisted air conditioning apparatus shown in FIG. 16.

FIG. 7 is a schematic representation of a fourth embodiment. In this system, the section related to the vapor compression heat pump device 200 and the process air passage A is the same as that in the conventional system shown in FIG. 16. In the regeneration air passage B between the outlet of the condenser (heating device) 220 for regeneration air and the inlet of regeneration air into the desiccant wheel 103, an auxiliary heating device 310 is connected to the passage B through the passages 127, 128. The auxiliary heating device 310 is used only for the purpose of regenerating the desiccant material quickly in this embodiment, therefore, a low cost and easily controllable electric heater is adopted. The process air passage A is provided with a temperature sensor 360 at the outlet of the desiccant device 103, for outputting signals to a controller 350 for controlling the electrical contact 330 of the heating device 310 to the power source 320.

The operation of the desiccant assisted air conditioning system having the configuration presented above will be explained blow.

First, the vapor compression refrigeration cycle of the heat pump will be explained. The refrigerant is evaporated by extracting latent heat of evaporation from the process air exiting the desiccant device 103, and is withdrawn by the compressor 260 through the passage 204 to be compressed, and the compressed refrigerant flows into the condenser (heating device) 220 through the passage 201, wherein it condenses while releasing the heat of condensation to the pre-desiccant regeneration air. The condensed refrigerant enters the expansion valve 250 through the passage 202, and after reducing its pressure and expanding, returns to the evaporator (cooling device) 240.

Next, the heat recovery operation will be explained with reference to FIG. 8, which is performed for a starting-up mode operation when the desiccant material has lost its adsorption ability after a prolonged period of disuse. This mode of operation is used to shorten the desiccant regeneration period. In this mode, moisture adsorption ability of the desiccant is lowered, leading to generation of lesser heat of adsorption, and the temperature at the outlet of desiccant device 103 is also lowered. The temperature sensor 360 senses the temperature drop, and by the action of the temperature controller 350, the electrical contact 330 is closed, and the electrical heating device (auxiliary heating device) 310 is activated.

Outside air (state Q) for use as regeneration air is drawn through the passage 124 into the blower 140, is pressurized, forwarded to the sensible heat exchanger 104. As described above, the moisture adsorption ability of the desiccant 103 is low and does not generate heat of adsorption which causes only a negligible amount of the temperature rise of process air (state (R)), leading to a negligible rise of the process air temperature. This also causes a negligible rise of the regeneration air in the sensible heat exchanger 104 and the regeneration air passes through without temperature change. The regeneration air from the sensible heat exchanger 104 flows into the condenser 220 through passage 126 to be heated by the heat pump 200 to raise its temperature (state S). Regeneration air from the condenser 220 flows through the passage 127 to reach the auxiliary heater 310 to a final temperature between 60°~80° C. (state T) so that its relative humidity is lowered. The regeneration air from the auxiliary heating device 310 having a lowered humidity flows through the desiccant wheel 103 thereby removing adsorbed moisture (state U). Spent outgoing air from the desiccant wheel 103 flows through the passage 129 to be exhausted to the exterior as waste air.

As described above, when the moisture adsorption ability of the desiccant material has been lowered, the auxiliary heating device can be used to heat the pre-desiccant regeneration air. This enables an air conditioning system having superior quick start-up characteristics to be realized.

It should be noted that the electrical heater used in the present embodiment as a auxiliary heating device 310 may be replaced with other heating sources such as heat exchanger based on steam or hot water. In such a case, the controller 350 can be controlled through electromagnetic valve or electrically operated valve in place of the electrical contact 330 used in the present embodiment. Compared with heat pump devices, auxiliary heating devices such as electrical heater provide high temperature heat much more readily than heat pump devices. However, in case of attempting to obtain high temperature by using heat pump devices, it is preferable that the auxiliary heating device be disposed upstream of the desiccant device and downstream of the condenser to avoid excess rise of the compression ratios of the compressors.

In the present embodiment shown in FIG. 7, the loss of moisture adsorption ability is detected by a temperature sensor disposed at the outlet of the desiccant device to measure the temperature of the outgoing process air. Other techniques of detecting the loss of adsorption ability of the desiccant device may be used, for example, directly detecting high relative humidity at the outlet of the post-desiccant process air, or measuring other parameters such as at least two of the variables, temperature, relative humidity and enthalpy to compute a parameter such as absolute humidity as a basis for judgment. It is also permissible to measure the temperature difference at the outlet/inlet of the desiccant device for the process air, and base the decision on a threshold value of the temperature difference. Also, it is possible to measure the relative humidity of the process air at the inlet/outlet of the desiccant device, and base the decision on a threshold value of the relative humidity.

Figure 8:
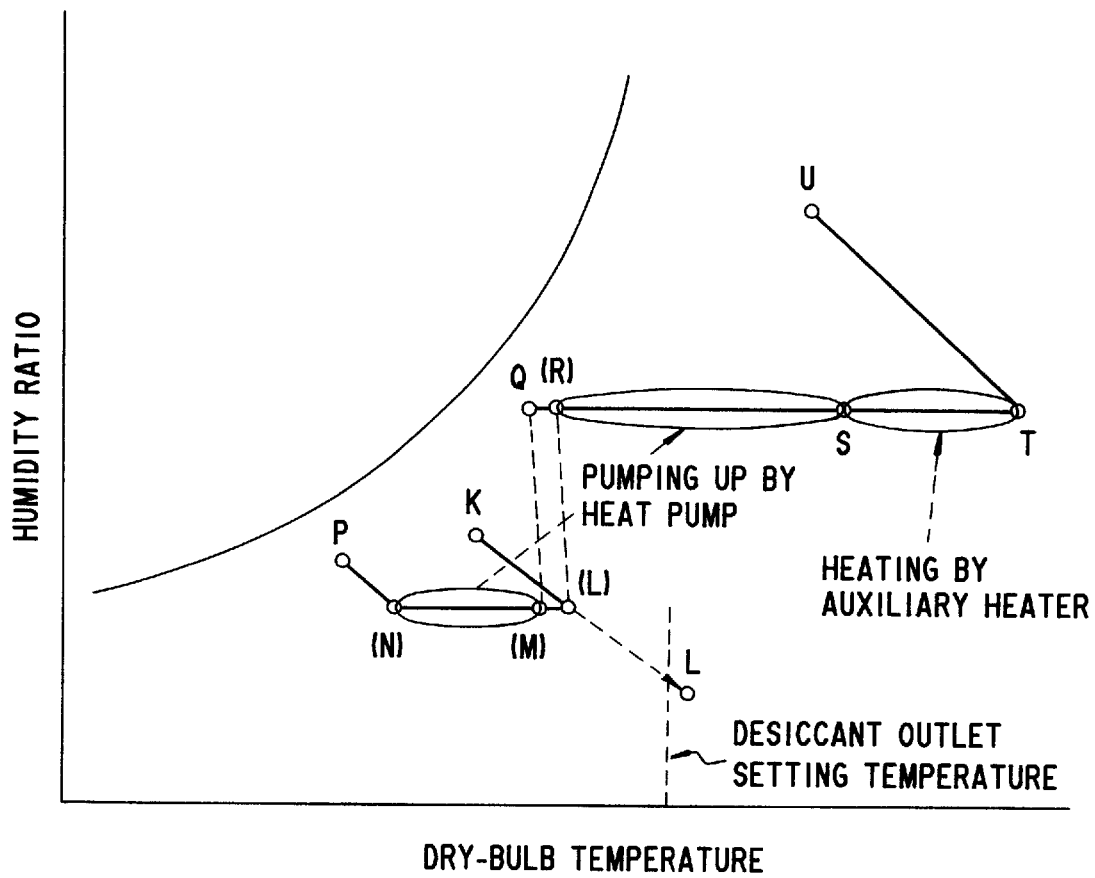
FIG. 8 is a psychrometric chart showing the desiccant air conditioning cycle of the fourth embodiment in case of a normal operational mode.

When the heating of the desiccant device by the auxiliary heating device 310 is continued, moisture adsorption ability of the desiccant material is recovered to result in increase in the heat of adsorption, and the temperature at the outlet of the desiccant device 103 (state L) increases gradually along the isenthalpy line shown by the dotted line in FIG. 8. When the moisture adsorption ability is increased sufficiently, the temperature of state L becomes higher than a predetermined value assigned to the outlet of the desiccant device 103. In this embodiment, this is detected by the controller 350 and the operation of the auxiliary heating device 310 is stopped, and the normal mode operation is resumed. This approach also contributes to energy conservation. The normal mode of operation has been explained previously.

Figure 9:
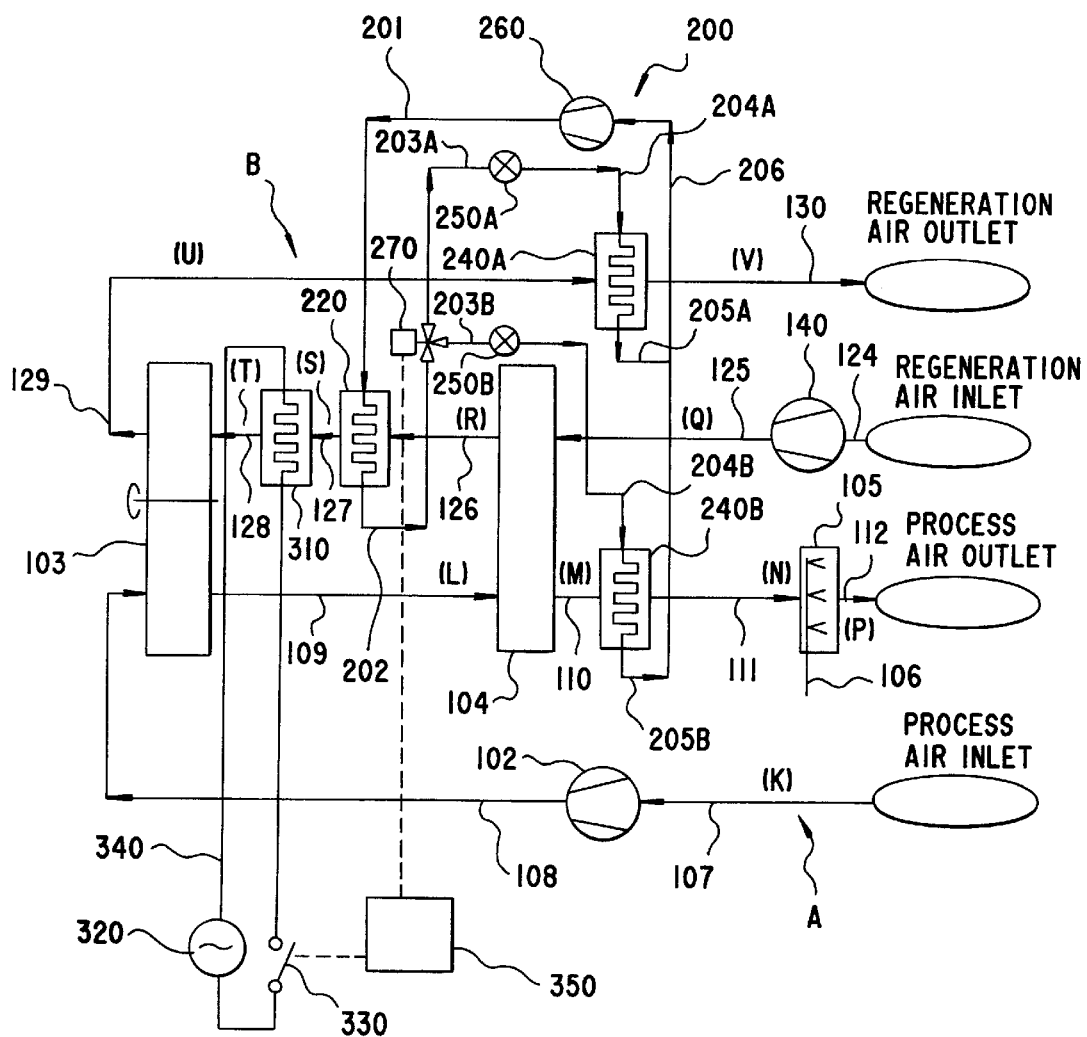
FIG. 9 is a schematic representation of a fifth embodiment of the desiccant assisted air conditioning apparatus of the present invention.

FIG. 9 is a schematic representation of the basic configuration of a seventh embodiment based on an improvement on the fifth embodiment shown in FIG. 5. The difference from the previous embodiment is that two evaporator 240A, 240B are provided to selectively communicate with the heat pump device 200 by means of a switching valve 270. One evaporator 240A provides a heat exchange function for post-desiccant regeneration air, while the other evaporator 240B provides heat exchange function for post-desiccant process air. The condenser 220 forms a heat exchanger with pre-desiccant regeneration air. This arrangement is the same as the second cooling unit shown in FIG. 5 for the third embodiment.

Figure 10:
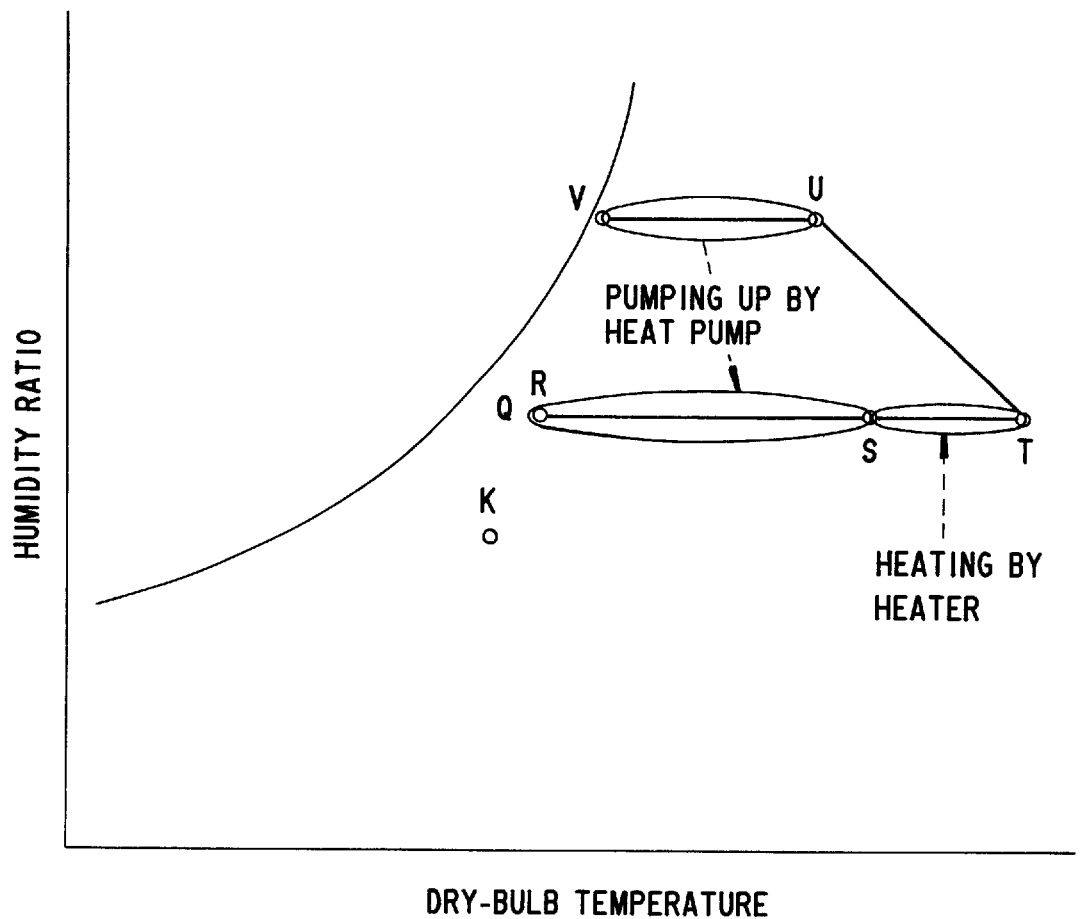
FIG. 10 is a psychrometric chart showing the desiccant air conditioning cycle of the fifth embodiment.

FIG. 10 is a psychrometric chart to show the operation of the evaporator 240A functioning as the heat exchanger with post-desiccant regeneration air in the desiccant assisted air conditioning system having the configuration described above. This arrangement is also used during the start-up phase of the operation of the system when the dehumidifying ability of the desiccant device is low due to a long period of disuse. In the operation of this system, the blower for the regeneration air is operated while that for the process air is stopped. Also, the auxiliary heating device 310 is activated by closing the electrical contact 330 through the controller 350, and also, the switching valve 270 for the cooling cycle is activated to select the evaporator 240A for heat exchange with the regeneration air.

As described above, when the moisture adsorption ability of the desiccant device 103 is low when the system is activated, the heat pump cycles of the heat pump device 200 enable to recover heat from the post-desiccant regeneration air to transfer heat to the pre-desiccant regeneration air. Therefore, a small additional initial capital investment is sufficient to result in a large benefit for the system. The coefficient of performance (COP) of heat pump devices are known to be some 3~4 times higher compared with electrical heaters, so that heat pump devices are energy conserving, and their operating cost is lower. The design of the system slows a small capacity auxiliary heating device to be used, and again the initial capital investment is low, and the operating cost is also low. The result is that a highly efficient and economical air conditioning system having quick start-up characteristics has been derived.

Although electrical heaters provide higher heat than heat pump devices, placement of the auxiliary electrical heater required some attention. It is preferred that the auxiliary heating device be placed upstream of the desiccant device and downstream of the condenser in the regeneration air passage.

The operation of the evaporator 240B for heat transfer with post-desiccant process air is the same as that of the configuration shown in FIG. 7, and has been explained with reference to the more diagram shown in FIG. 8. This normal mode of operation is used after the completion of the start-up phase mode when the adsorption ability of desiccant material is completely recovered.

Figure 11:
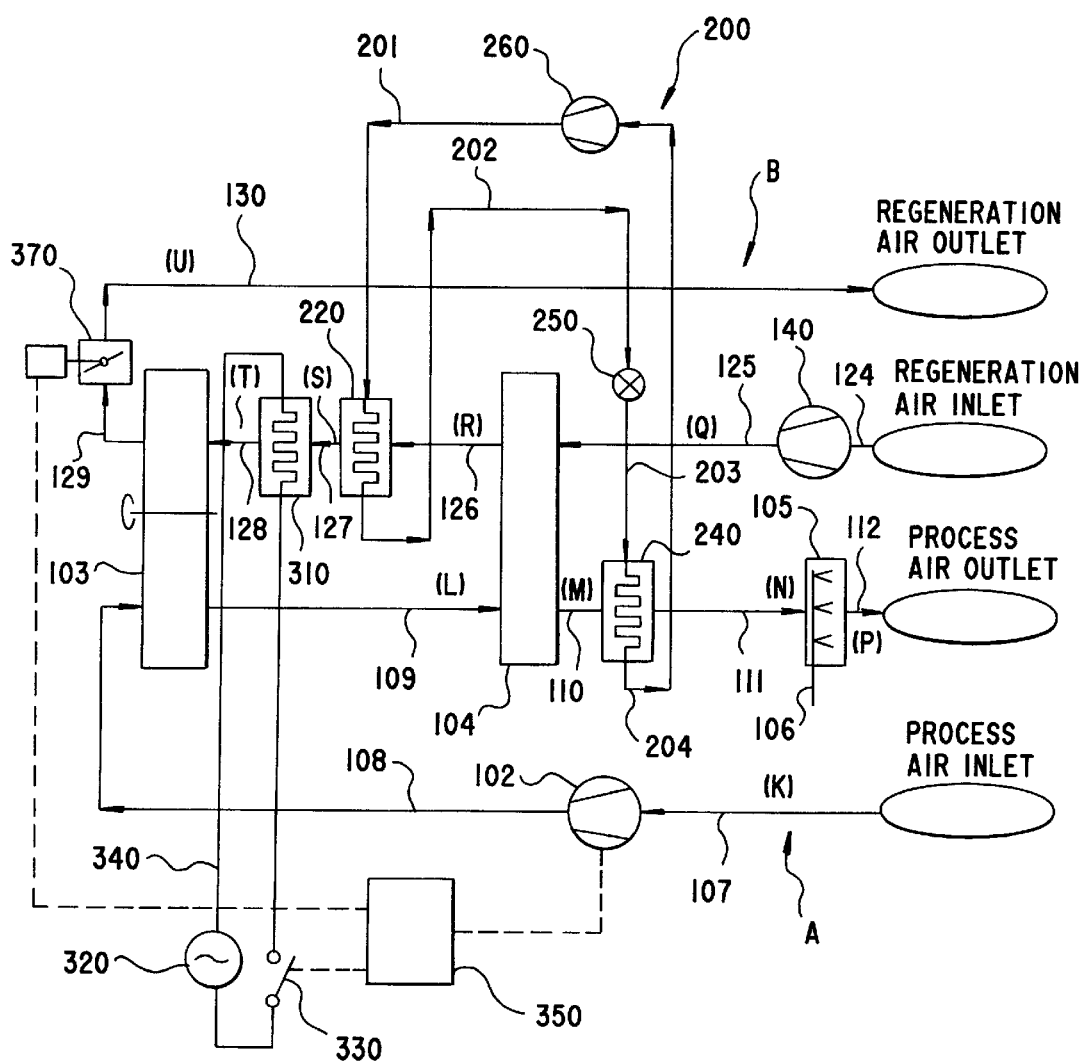
FIG. 11 is a schematic representation of a sixth embodiment of the desiccant assisted air conditioning apparatus of the present invention.

FIG. 11 presents a sixth embodiment which is an improvement over the fourth embodiment shown in FIG. 7. The improvement relates to the presence of a damper 370 which is placed downstream of the desiccant wheel 103 in the passage 129 of the regeneration air passage B. The outlet of the damper 370 communicates with outside environment through the passage 130. The auxiliary heating device 310 and the damper 370 are provided with a controller 350 for activating the auxiliary heating device 310 and adjusting the opening of the damper 370 during the start-up mode of operation when the moisture adsorption ability of the desiccant device is insufficient. During the start-up mode, the damper 370 limits the flow of regeneration air for quick heating by the auxiliary heating device 310.

Figure 12:
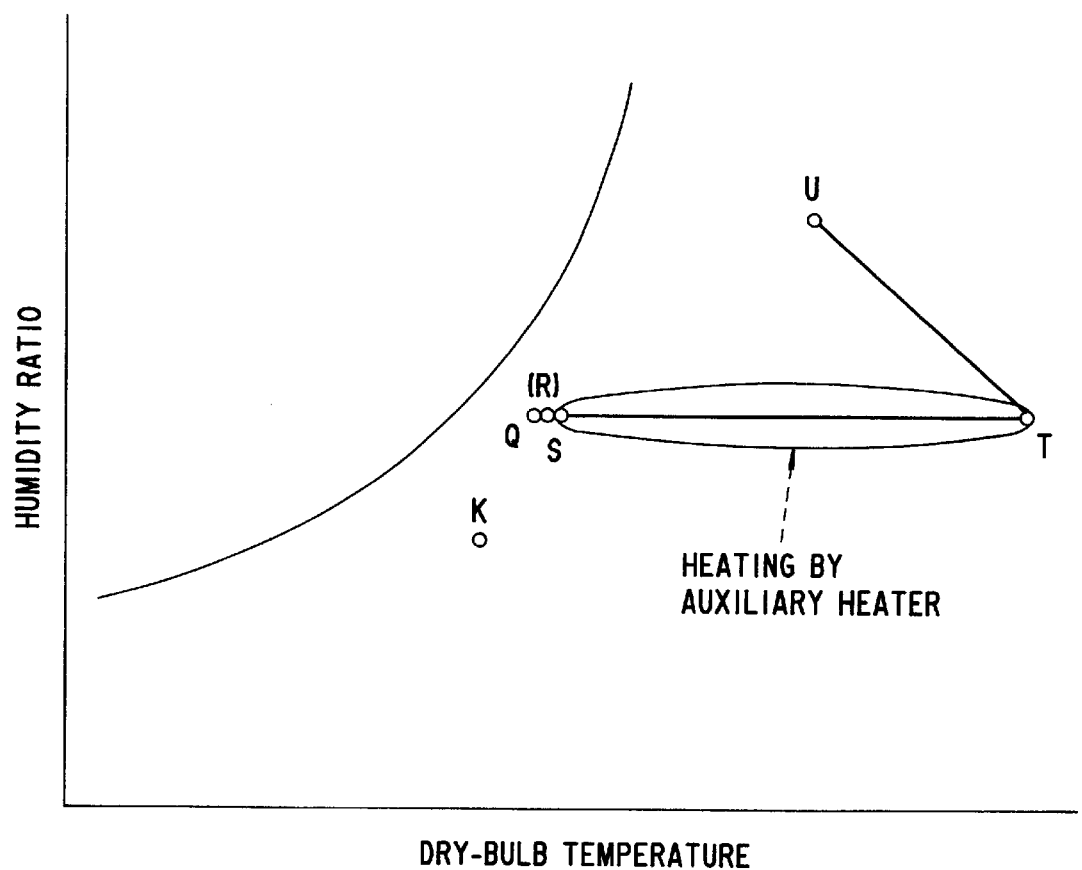
FIG. 12 is a psychrometric chart showing the desiccant air conditioning cycle of the sixth embodiment in case of a normal operational mode.

FIG. 12 is a psychrometric chart of the system during the start-up mode in which the dehumidifying ability of the desiccant device is still low. During this period, the start-up mode, the controller 350 does not activate the blower 102 for the process air and the heat pump device 200, therefore, the process air does not circulate, and the evaporator 240 and the condenser 220 do not operate to cool or heat either the process air or regeneration air.

Outside air (state Q) as regeneration air is withdrawn by the blower 140 through the passage 124 to be pressured, and the pressured process air is forwarded to the sensible heat exchanger 104. In the sensible heat exchanger 104, because the process air is not circulated, no heat is exchanged. Therefore, the regeneration air flows through without increasing its temperature. Regeneration air exiting the sensible heat exchanger 104 is forwarded to the condenser (heating device) 220, but because the heat pump device is not operating, its temperature does not rise and flows through without changing its temperature (state S). Regeneration air exiting the condenser (heating device) 220 through the passage 127 is heated in the auxiliary heating device 310. Since the flow rate is restricted by the damper 370, and the heat capacity of air is low, a small amount of heat is sufficient to increase the regeneration air temperature to 60°~80° C. (state T), which is the same level as that in a normal mode operation, to produce regeneration air having a low relative humidity. Regeneration air exiting the auxiliary heating device 370 and having sufficiently low humidity flows through the desiccant wheel 103 to remove moisture from the desiccant material, thus regenerates the desiccant material. Regeneration air which has flowed through the desiccant wheel 103 is discharged to outside environment through the passage 129 and the damper 370.

As described above, even when the dehumidifying ability of the desiccant device is low, start-up mode of operation can be employed by utilizing the auxiliary heating device 310 to heat the regeneration air, and utilizing the damper 370 to adjust its opening to limit the flow rate, so that high temperature regeneration air having low humidity necessary to regenerate the desiccant material can be produced. The desiccant device is restored to its full operational adsorption ability. When the controller 350 judges that the adsorption ability of the desiccant device has been fully recovered, the damper 370 is opened, the auxiliary heating device 310 is stopped, and the blower 102 is started.

As explained above, the start-up mode operation is constituted by first limiting the flow rate of regeneration air to produce high temperature regeneration air having a low relative humidity. After the desiccant adsorption ability has been recovered fully, the heat pump device and the blower in the process air passage are activated to quickly raise the exit temperature of process air from the desiccant device. Therefore, the temperature of exiting air from the sensible heat exchanger is also raised, and because of the heat pump effect, the temperature of regeneration air at the outlet of the condenser is also raised to produce regeneration air having a low relative humidity. These steps assure short start-up period, and enable to present a superior performing air conditioning system. It may be possible not to wait for full recovery of desiccant adsorption ability when a lower ability operation is sufficient or early start is needed, controller 350 can adjust to vary operational parameters such as the blower speed.

In this embodiment, insufficient dehumidifying ability may be detected by various devices. It is permissible to use a timer to measure the duration of disuse so that when a predetermined duration has elapsed, the start-up mode of operation may be selected automatically. It is also permissible to provide a weighing means for determining the adsorption amount loaded on the desiccant device. It is also permissible to arrange so that the start-up mode steps are always followed at the beginning for a prescribed duration. The completion of the start-up phase can be determined by using a timer, or the temperature. Also, it is possible to measure the regeneration air temperature of post-desiccant regeneration air, and by utilizing the phenomenon that when the regeneration process is completed the heat of adsorption is no longer generated, a rise to a steady level in the temperature of regeneration air may be taken as an indication of regeneration completion to start the normal mode of operation. The relative humidity difference in the process air may be used to determine the endpoint by measuring the relative humidity difference at the inlet/outlet of the desiccant device.

Figure 13:
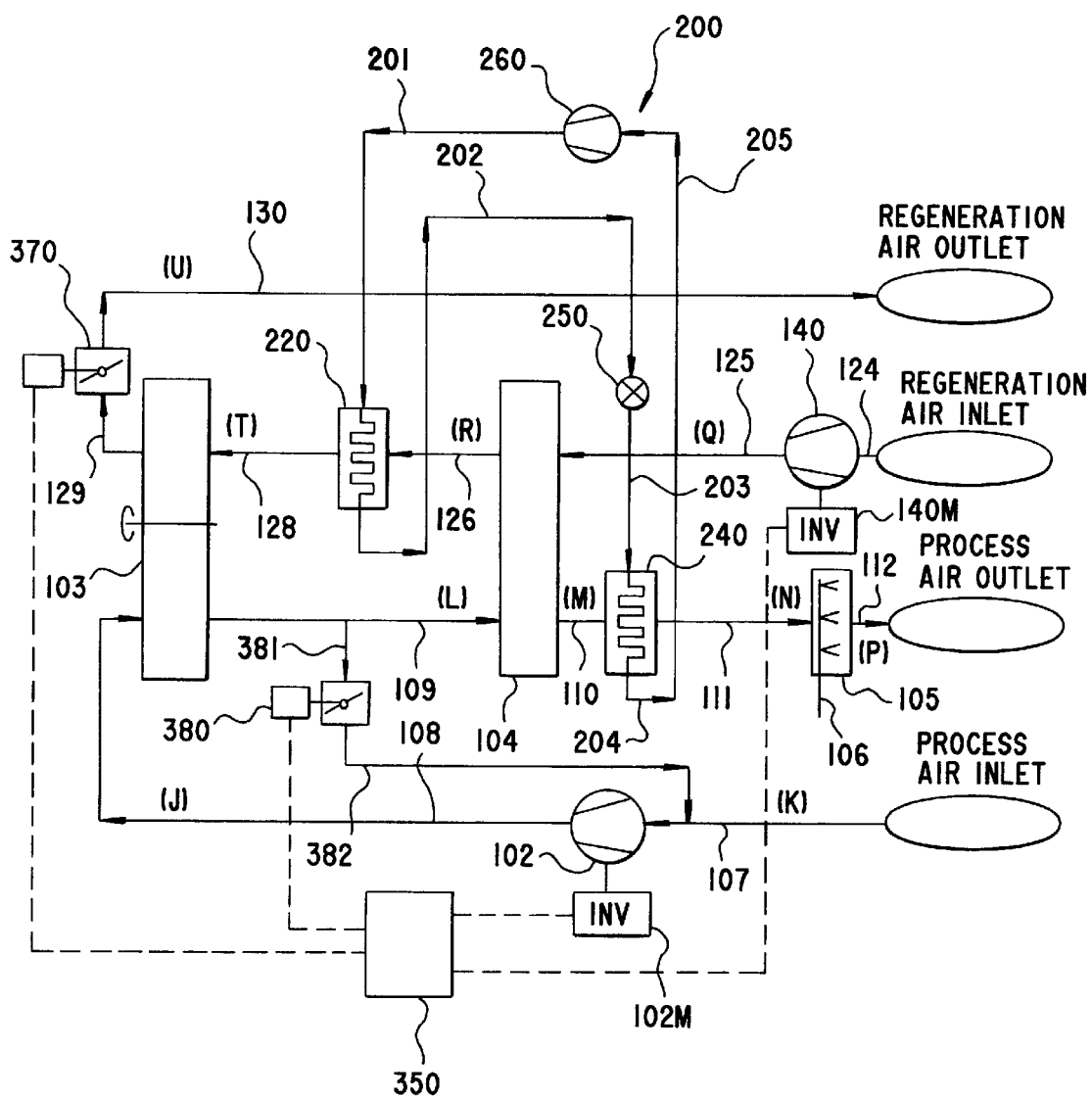
FIG. 13 is a schematic representation of a seventh embodiment of the desiccant assisted air conditioning apparatus of the present invention.

FIG. 13 shows a seventh embodiment. In this embodiment, the auxiliary heating device used in the sixth embodiment has been eliminated, and in the process air passage, bypass passages 381, 382 are provided from the downstream side of the desiccant device to the inlet of the blower in the upstream side. A damper 380 is also provided between the bypass passages 381, 382. By adopting this configuration, start-up mode can be provided as in the case of sixth embodiment. As in the previous embodiments, during the start-up mode, which is selected when the dehumidifying ability of the desiccant device has been lowered because of a long time disuse, desiccant regeneration is preferred.

Figure 14:
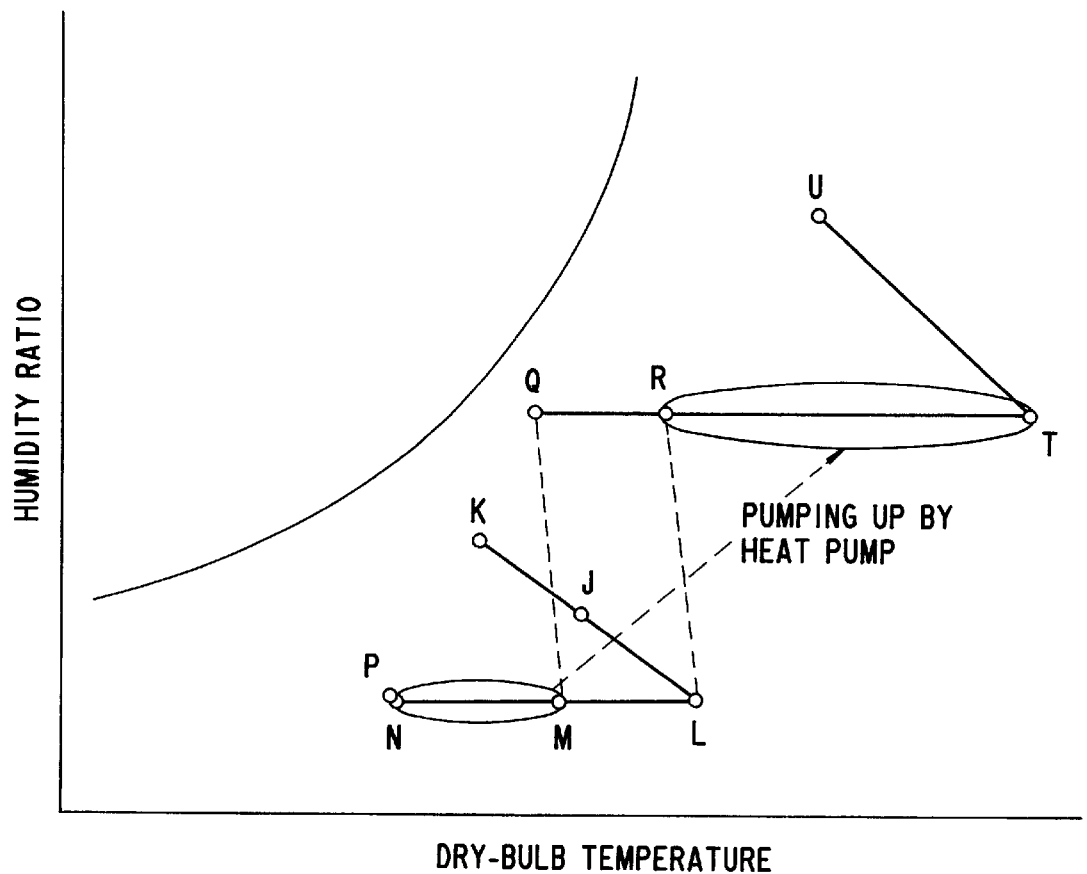
FIG. 14 is a psychrometric chart showing the desiccant air conditioning cycle of the seventh embodiment.
Figure 15:
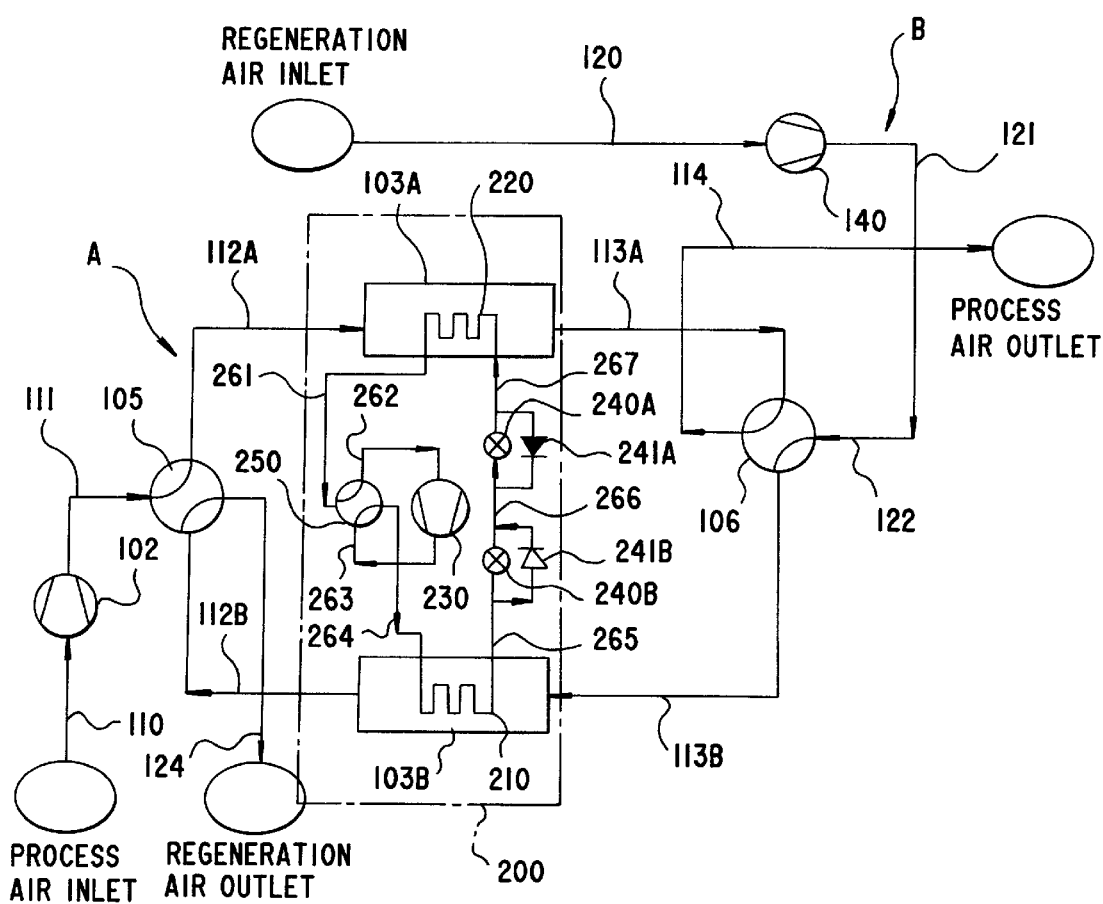
FIG. 15 is a schematic representation of a conventional desiccant assisted air conditioning apparatus of the present invention.

Such an operation for a start-up mode will be explained by referring to FIG. 14, a psychrometric chart of the system. The introduced return air (process air: state K) merges with bypassed air from the desiccant wheel 103 (state L) to be mixed (state J), flows through passage 107 to be drawn into blower 102 thereby being pressurized, flows through passage 108 to pass through the desiccant wheel 103 so that its humidity ratio will be lowered by adsorption of moisture to the moisture adsorbent while its temperature rises (state L) by the heat of adsorption. The amount of adsorbed moisture in the adsorption step corresponds to a thermodynamic difference between state J and state L, which is smaller than the difference between state J and state L for the normal mode operation in which the bypass passage is closed. The air with a lower humidity and a higher temperature flows into a two branched flows. One flows through the passage 109 to reach the sensible heat exchanger 104, and is cooled by heat exchange with the regeneration air (state M), flows the passage 110 to reach the evaporator 240 to be further cooled (state N), flows into a humidifier 105 so that its temperature is lowered in an isenthalpic manner by water spraying or evaporative humidification (state P), and is returned through the passage 112 to the conditioning space 101. The other flows through the bypass passages 381, 382 and bypass damper 380 to be mixed with the process air of state K.

In the regeneration air passage, flow rate of regeneration air is reduced by adjusting the opening of the damper 370 by the controller 350. Regeneration air (state Q) is withdrawn by the blower 140 through the passage 124 to be pressured, and the pressured process air is forwarded to the sensible heat exchanger 104 to cool the process air as well as to raise its own temperature (state R). In the sensible heat exchanger 104, because the regeneration air is of reduced flow rate to have less heat capacity, it is heated by the heat pump to a final temperature of 60°–80° C. (state T), to have a low relative humidity. Regeneration air having low relative humidity flows through the desiccant wheel 103 to remove moisture from the desiccant material, thus regenerates the desiccant material. Regeneration air which has flowed through the desiccant wheel 103 is discharged to outside environment through the passages 129, 130 by way of the damper 370.

As described above, two basic approaches are taken to shorten the start-up phase. First, the controller 350 is used to control the opening of the damper 370 so that the flow rate of regeneration air is decreased, and the heat pump device 200 is used to increase the temperature of regeneration air, to lower its humidity and to recover its regenerative ability. Second, the process air is circulated in the bypass passages between the blower 102 and the desiccant device 103 so as to prevent moisture introduction from the outside environment. These two basic steps are effective in producing quick recovery of desiccant adsorption ability.

According to the above described operation of the embodiment, it is possible to supply some amount of process air at low temperature and low humidity even in the start-up mode. In this embodiment, it is permissible to use an auxiliary heating device downstream of the condenser 220 in the regeneration air passage B, as in the case of sixth embodiment. Also, in the sixth and seventh embodiments, the controller may be used in place of or together with the damper for controlling the rotational speed of the blower to decrease the flow rate of process air. By such a construction, it is possible to decrease the contact volume between the process air and the desiccant device thereby controlling the adsorption of moisture in the desiccant material.

What is claimed is:

1. A desiccant assisted air conditioning system comprising:
   a process air passage for flowing a process air;
   a regeneration air passage for flowing a regeneration air;
   a desiccant device which can be selectively communicated with any one of said process air passage and said regeneration air passage;
   a heat pump device having a compressor, an evaporator, a condenser and a heat pump cycle passage for flowing a refrigerant therein, said heat pump providing a heating heat source for heating said regeneration air and a cooling heat source for cooling said process air;
   a recovery heat exchanger for recovering heat from said regeneration air flowing downstream of said desiccant device in said regeneration air passage into said refrigerant flowing in said heat pump cycle passage for use as heat of evaporation in said heat pump device, said recovery heat exchanger being arranged downstream of and in series with said evaporator in said heat pump cycle passage; and
   switching means for selectively activating said recovery heat exchanger in accordance with a selected mode of operation of said desiccant assisted air conditioning system.

2. The desiccant assisted air conditioning system as claimed in claim 1, further comprising a controller for judging a mode of operation and operating said switching means.

3. The desiccant assisted air conditioning system as claimed in claim 1, further comprising a sensor for any one of directly and indirectly sensing adsorption ability of said desiccant device.

4. The desiccant assisted air conditioning system as claimed in claim 1, further comprising a sensible heat exchanger for exchanging sensible heat between regeneration air flowing upstream of said condenser in said regeneration air passage and process air flowing upstream of said evaporator in said process air passage.

5. The desiccant assisted air conditioning system as claimed in claim 1, further comprising a sensible heat exchanger for exchanging heat between regeneration air flowing upstream of said condenser in said regeneration air passage and regeneration air flowing downstream of said desiccant device in said regeneration air passage.

6. A desiccant assisted air conditioning system comprising:
   a process air passage for flowing a process air;
   a regeneration air passage for flowing a regeneration air;
   a desiccant device which can be selectively communicated with any one of said process air passage and said regeneration air passage;
   a heat pump device having a compressor, an evaporator, a condenser and a heat pump cycle passage for flowing a refrigerant, said heat pump providing a heating heat source for heating said regeneration air and a cooling heat source for cooling said process air;
   a regeneration promoting means for temporary promoting a regeneration ability of said regeneration air;
   switching means for selectively activating said regeneration promoting means in accordance with a selected mode of operation;
   a sensor for sensing absorption ability of said desiccant device;
   a controller for selecting a mode of operation from any one of a start-up mode in which said regeneration promoting means is activated and a normal mode in which said regeneration promoting means is not activated based upon an output signal of said sensor and operating said switching means.

7. The desiccant assisted air conditioning system as claimed in claim 6, wherein said regeneration promoting means comprises a temperature rise expediting means for expediting temperature rise of said regeneration air flowing upstream of said desiccant device in said regeneration passage.

8. The desiccant assisted air conditioning system as claimed in claim 6, wherein said temperature rise expediting means comprises an auxiliary heating device.

9. The desiccant assisted air conditioning system as claimed in claim 8, wherein said auxiliary heating device comprises an electric heater.

10. The desiccant assisted air conditioning system as claimed in claim 8, wherein said auxiliary heating device comprises a heat exchanger provided with a heat source fluid passage for flowing any one of hot water and steam.

11. The desiccant assisted air conditioning system as claimed in claim 8, wherein said auxiliary heating device comprises a second heat pump device.

12. The desiccant assisted air conditioning system as claimed in claim 11, wherein said second heat pump device provides another cooling heat source for cooling said process air.

13. The desiccant assisted air conditioning system as claimed in claim 7, wherein said temperature rise expediting means comprises a flow controller means for controlling regeneration air flow rate within said regeneration air passage.

14. The desiccant assisted air conditioning system as claimed in claim 6, wherein said regeneration promoting means comprises an adsorption suppressing means for suppressing moisture adsorption on said desiccant device.

15. The desiccant assisted air conditioning system as claimed in claim 14, wherein said adsorption suppressing means comprises a process air control means for controlling a flow rate of process air flowing through said desiccant device.

16. The desiccant assisted air conditioning system as claimed in claim 15, wherein said process air control means comprises a damper.

17. The desiccant assisted air conditioning system as claimed in claim 14, wherein said adsorption suppressing means comprises a process air bypass passage for returning at least a portion of post-desiccant process air to a pre-desiccant process air passage.

18. The desiccant assisted air conditioning system as claimed in claim 6, wherein said regeneration promoting means comprises a temperature rise expediting means for expediting temperature rise of said regeneration air flowing upstream of said desiccant device in said regeneration passage and an adsorption suppressing means for suppressing moisture adsorption on said desiccant device.

19. The desiccant assisted air conditioning system as claimed in claim 6, further comprising a sensible heat exchanger for exchanging sensible heat between regeneration air flowing upstream of said condenser in said regeneration air passage and process air flowing upstream of said evaporator in said process air passage.

20. The desiccant assisted air conditioning system as claimed in claim 6, further comprising a sensible heat exchanger for exchanging heat between regeneration air flowing upstream of said condenser in said regeneration air passage and regeneration air flowing downstream of said desiccant device in said regeneration air passage.

21. A desiccant assisted air conditioning system comprising:
a process air passage for flowing a process air;
a regeneration air passage for flowing a regeneration air;
a desiccant device which can be selectively communicated with any one of said process air passage and said regeneration air passage;
a first heat pump device having a first compressor, a first evaporator, a first condenser and a first heat pump cycle passage for flowing a refrigerant therein, said first heat pump device providing a heating heat source for heating said regeneration air through heat exchange between said first condenser and a pre-desiccant regeneration air and a cooling heat source for cooling said process air through heat exchange between said first evaporator and a post-desiccant process air;
a second heat pump device having a second compressor, a second evaporator, a second condenser and a second heat pump cycle passage for flowing a refrigerant therein, said second heat pump device recovering a heat from said regeneration air into said refrigerant through heat exchange between said second evaporator and a post-desiccant regeneration air and heating said process air through heat exchange between said second condenser and a pre-desiccant process air.

22. The desiccant assisted air conditioning system as claimed in claim 21, wherein said second condenser exchanges heat with said regeneration air at an upstream in said regeneration air passage than said first condenser.

23. The desiccant assisted air conditioning system as claimed in claim 21, wherein said second evaporator is selectively heat-exchangeable with any one of said post-desiccant regeneration air and said post-desiccant process air.

24. The desiccant assisted air conditioning system as claimed in claim 23, wherein said second evaporator is heat-exchangeable with said process air in an upper stream in said process air passage than said first evaporator.

25. A method for controlling a desiccant assisted air conditioning system, said system comprising:
a process air passage for flowing process air;
a regeneration air passage for flowing regeneration air;
a desiccant device which can be selectively communicated with any one of said process air passage and said regeneration air passage;
a heat pump device having a compressor, an evaporator, a condenser and a heat pump cycle passage for flowing refrigerant therein, said heat pump providing a heating heat source for heating said regeneration air and cooling heat source for cooling said process air; and
wherein a start-up is conducted by limiting a moisture adsorption into said desiccant device and prompting a temperature rise of said regeneration air.

26. The method as claimed in claim 25, wherein a flow rate of said regeneration air is reduced during said temperature rise prompting process.

27. The method as claimed in claim 26, wherein said flow rate of said regeneration air is controlled by adjusting a rotation speed of a blower provided in said regeneration air passage.

28. The method as claimed in claim 25, wherein an auxiliary heater is activated at an upstream of said desiccant device in said regeneration air passage during said temperature rise prompting process.

29. The method as claimed in claim 25, wherein process air flow is stopped in said process air passage during said moisture adsorption limiting process.

30. The method as claimed in claim 24, wherein at least a part of said process air flows to bypass said desiccant device during said moisture adsorption limiting process.

31. The method as claimed in claim 24, wherein a flow rate of said process air is controlled by adjusting rotation speed of a blower provided in said process air passage during said moisture adsorption limiting process.

32. The desiccant assisted air conditioning system as claimed in claim 1, wherein said switching means comprises a bypass passage provided in at least one of said regeneration air passage and said heat pump cycle passage to bypass said recovery heat exchanger and a valve device for selectively flowing fluid flowing in any one of said regeneration air passage and said heat pump cycle passage to any one of said recovery heat exchanger and said bypass passage.

33. The desiccant assisted air conditioning system as claimed in claim 6, wherein said sensor is for detecting any one of temperature and relative humidity at an exit of said desiccant device in said process air passage.

34. The desiccant assisted air conditioning system as claimed in claim 6, wherein said sensor is for detecting any one of a temperature difference and a relative humidity difference between an inlet and an exit of said desiccant device in said process air passage.

35. The desiccant assisted air conditioning system as claimed in claim 6, further comprising a flow controller means for controlling a blower provided in said regeneration air passage.

36. A desiccant assisted air conditioning system as claimed in claim 6, wherein said sensor indirectly senses absorption ability of said desiccant device.

* * * * *